Sept. 18, 1923.
J. B. VAUGHAN ET AL
1,468,585
INSECT CATCHING ATTACHMENT FOR CULTIVATORS
Filed Dec. 20, 1922      2 Sheets-Sheet 1
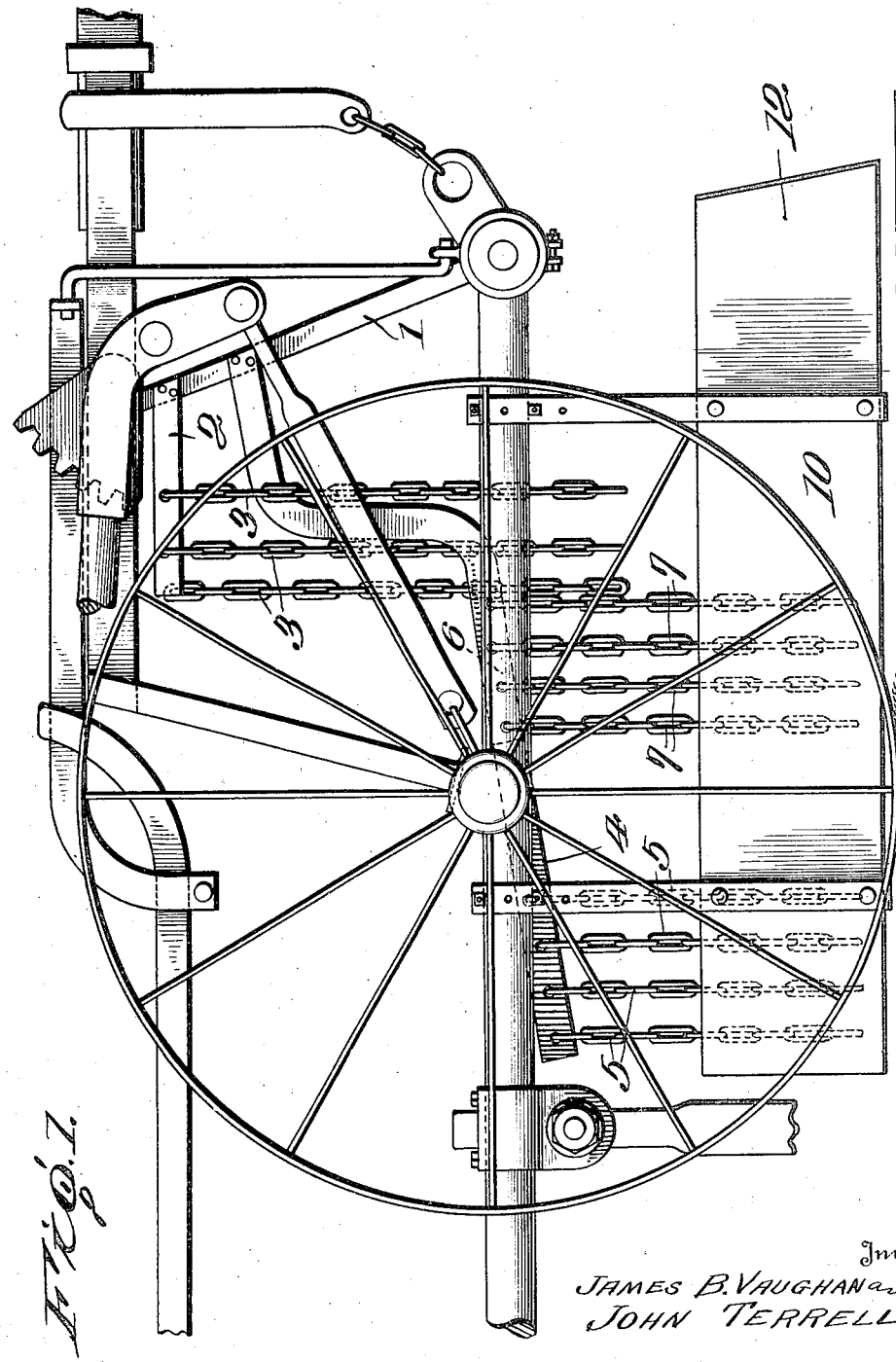
Inventors
JAMES B. VAUGHAN and
JOHN TERRELL
By Francis P. Maguire
Attorney Sept. 18, 1923.
J. B. VAUGHAN ET AL
1,468,585
INSECT CATCHING ATTACHMENT FOR CULTIVATORS
Filed Dec. 20, 1922   2 Sheets-Sheet 2
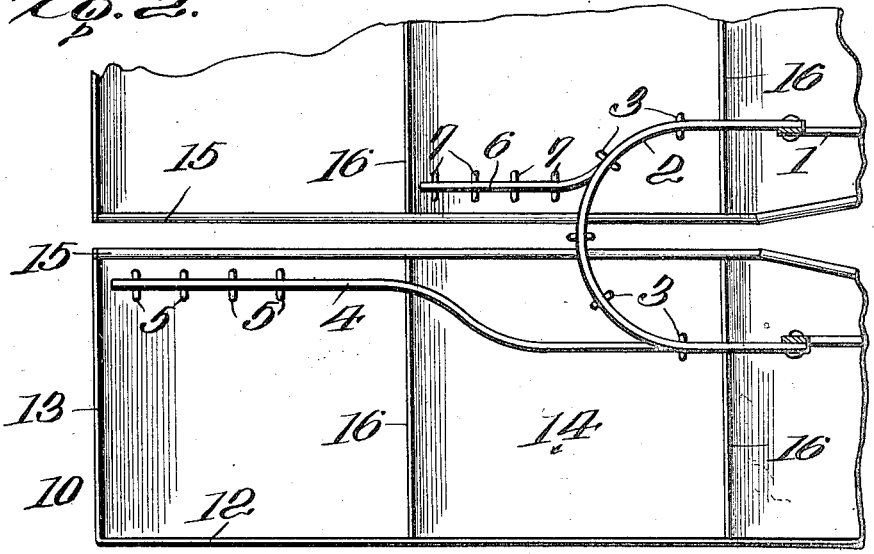
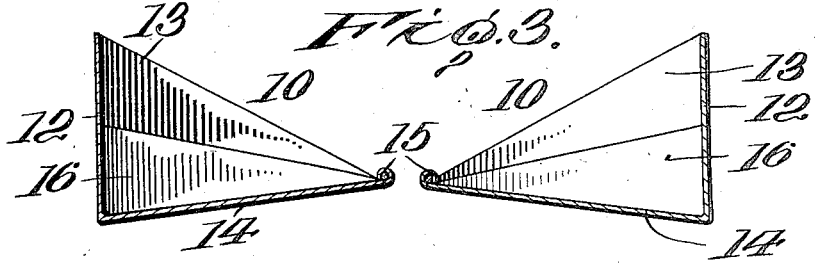
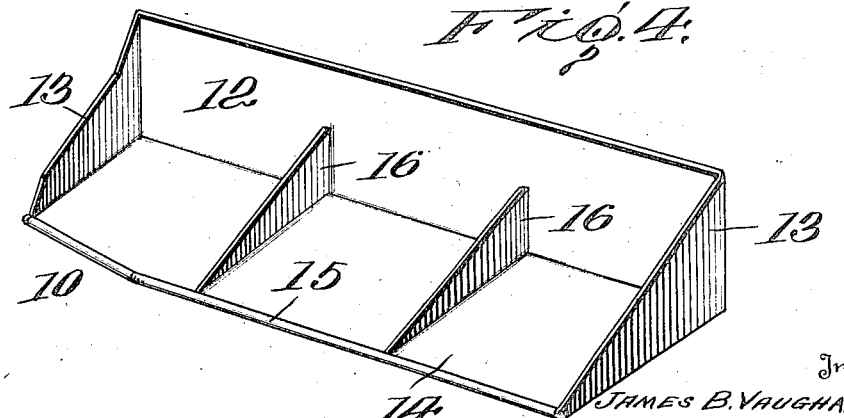

Patented Sept. 18, 1923.

1,468,585

UNITED STATES PATENT OFFICE.

JAMES BUFORD VAUGHAN, OF LACY SPRINGS, AND JOHN TERRELL, OF TAYLORSVILLE, ALABAMA.

INSECT-CATCHING ATTACHMENT FOR CULTIVATORS.

Application filed December 20, 1922. Serial No. 607,946.

*To all whom it may concern:*

Be it known that we, JAMES BUFORD VAUGHAN, of Lacy Springs, in the county of Morgan and State of Alabama, and JOHN TERRELL, of Taylorsville, in the county of Madison and State of Alabama, have invented certain new and useful Improvements in Insect-Catching Attachments for Cultivators; and we do hereby declare the following to be a full, clear, and exact description of the invention, such as will enable others skilled in the art to which it appertains to make and use the same.

Our invention relates to attachments for cultivators and more particularly to that class of attachments which are designed to knock insects from the growing plants and into a receptacle where they are exterminated. The object of our invention is to provide a simple contrivance which may readily be attached to all standard makes of cultivators without in any way disfiguring the implement and one embodying an efficient means for effecting removal of insects such as boll-weevil and the like and punctured squares without injuring the growing plant, such insects and defective squares being caught in pans carried by the cultivator.

In the drawings, Figure 1 is a view in side elevation of a portion of a cultivator with our improved attachment applied thereto. Figure 2 is a top plan view showing the relative positions of the different parts of our attachment, the cultivator parts being omitted for the sake of clearness. Figure 3 is a sectional view through the two pans which catch the insects. Figure 4 is a view in perspective of one of the pans.

The arch of the cultivator is shown at 1, and forms a support for an iron bar 2, preferably bowed, and the ends of which are respectively secured to the uprights of the arch, a series of chains 3 are suspended from the bar 2, these chains approximately spanning the open space between the sides of the cultivator, one end of each hanging free. 4 designates an arm arranged longitudinally of the cultivator and having its forward end secured to the frame of the cultivator at one side of the arch.

From its point of connection with the frame the arm extends rearwardly and is then curved downwardly and inwardly, the free end of the arm projecting rearwardly in an approximately horizontal position. This outer free end forms a support for a second series of freely suspended chains 5. A second arm 6 of similar shape to that first mentioned, and like the frame 4 is secured at one end to the arm but on the opposite side of the arch is of a length less than the first arm. It too, supports a series of chains 7 at its outer end which is intermediate the chains 3 and the chains 5. These chains 7 are suspended only from one end. The arms 4 and 6 are so arranged that the chains secured to each will be in a line offset to each other. The chains 3, by reason of their semi-circular arrangement, practically encircle the plant as it is reached in cultivation and with the chains 5 and 7 as they advance upon the plant act in the manner of a coarse comb and disengage the insects and punctured squares from the plant. Appropriately supported by side members of the cultivator are two pans or troughs 10. These pans are located beneath the series of chains with a space between the adjacent edges to allow the plant to pass between, the space being regulated as desired. Each pan has a vertically disposed side wall 12 and two end walls 13 which form the three sides of the pan. The bottom 14 is slightly inclined so as to fit the ridge of soil thrown up by the cultivation of the plant, and each pan along its open side has its edge rolled or beaded as at 15, this rolled edge serving as a curb to aid in retaining kerosene or other exterminator in the trough-like bottom of the pan. I preferably provide partitions 16 in each pan so as to limit the wastage of kerosene as much as possible. The edge of each pan near its front is cut away, as shown in Figure 4, to aid in bringing the plants into position between the pans without in any way injuring them.

In the operation of the cultivator, with its arch straddling the row of plants, the chains suspended from the bar 1 will tend to envelop the plant as they are moved thereover and will whip off the insects and punctured squares, being further aided to that end by the chains 5 and 7 which respectively strike the opposite sides of the plant. After the operation the contents of the pans are usually burned.

We claim as our invention:

1. An insect catching attachment for cultivators including a member attached to each side of the arch of the cultivator, a plurality of chains depending from said member, arms extending rearwardly from the front of the cultivator, one of said arms being of less length than the other, a plurality of chains located near the extremity of each arm and troughs beneath the chains.

2. An insect catching attachment for cultivators including a member attached to each side of the arch of a cultivator, a plurality of chains having each one end attached to said member and the opposite end hanging free, arms extending rearwardly from the front of the cultivator with their outer ends in a plane lower than the plane of the member attached to the arch, one of said arms being of less length than the other, a plurality of chains suspended from the extremity of each arm so that one end will hang free, and troughs beneath the chains.

In testimony whereof we have signed this specification.

JAMES BUFORD VAUGHAN.
JOHN TERRELL.